United States Patent
Min et al.

(10) Patent No.: US 10,622,664 B2
(45) Date of Patent: Apr. 14, 2020

(54) POUCH TYPE SECONDARY BATTERY

(71) Applicant: LG CHEM, LTD., Seoul (KR)

(72) Inventors: Ki Hong Min, Daejeon (KR); Seung Ho Na, Daejeon (KR); Jin Ho Ban, Daejeon (KR)

(73) Assignee: LG CHEM, LTD., Seoul (KR)

( * ) Notice: Subject to any disclaimer, the term of this patent is extended or adjusted under 35 U.S.C. 154(b) by 313 days.

(21) Appl. No.: 14/901,900

(22) PCT Filed: Sep. 15, 2014

(86) PCT No.: PCT/KR2014/008570
§ 371 (c)(1),
(2) Date: Dec. 29, 2015

(87) PCT Pub. No.: WO2015/046792
PCT Pub. Date: Apr. 2, 2015

(65) Prior Publication Data
US 2016/0372783 A1    Dec. 22, 2016

(30) Foreign Application Priority Data

Sep. 26, 2013 (KR) .................. 10-2013-0114248
Sep. 11, 2014 (KR) .................. 10-2014-0120115

(51) Int. Cl.
*H01M 10/04* (2006.01)
*H01M 10/0585* (2010.01)
(Continued)

(52) U.S. Cl.
CPC ......... *H01M 10/0436* (2013.01); *H01M 2/02* (2013.01); *H01M 2/0207* (2013.01);
(Continued)

(58) Field of Classification Search
CPC .. H01M 10/0436; H01M 10/647; H01M 2/02; H01M 2/0207; H01M 2/0212;
(Continued)

(56) References Cited

U.S. PATENT DOCUMENTS

2001/0005561 A1    6/2001  Yamada et al.
2002/0160257 A1 * 10/2002  Lee .................. H01M 6/46
                                                        429/152
(Continued)

FOREIGN PATENT DOCUMENTS

CN    101897058 A    11/2010
CN    103098256 A     5/2013
(Continued)

OTHER PUBLICATIONS

International Search Report, issued in PCT/KR2014/008570, dated Dec. 11, 2014.

*Primary Examiner* — Cynthia H Kelly
*Assistant Examiner* — Rashid A Alam
(74) *Attorney, Agent, or Firm* — Birch, Stewart, Kolasch & Birch, LLP

(57) ABSTRACT

Provided is a pouch type secondary battery including an electrode assembly accommodated in an accommodating part of a pouch exterior part. A vertex part of an inner surface of the accommodating part is rounded. The electrode assembly includes a unit stack part that has a structure (a) in which a type of radical units are repeatedly disposed, wherein electrodes and separators are alternately disposed and are integrally coupled in the radical units, and the number of the electrodes is the same as the number of the separators, or a structure (b) in which two or more types of radical units are disposed in a predetermined order, wherein electrodes and separators are alternately disposed and are integrally coupled in the radical units, and the number of the electrodes is the same as the number of the separators. Distal ends of (Continued)

neighboring ones of the separators are not adhered to each other.

25 Claims, 23 Drawing Sheets

(51) Int. Cl.
    *H01M 2/02*     (2006.01)
    *H01M 2/16*     (2006.01)
    *H01M 10/052*     (2010.01)
    *H01M 2/14*     (2006.01)
    *H01M 10/0525*     (2010.01)

(52) U.S. Cl.
    CPC ......... *H01M 2/0212* (2013.01); *H01M 2/145* (2013.01); *H01M 2/168* (2013.01); *H01M 2/1673* (2013.01); *H01M 2/1686* (2013.01); *H01M 10/0413* (2013.01); *H01M 10/0445* (2013.01); *H01M 10/0463* (2013.01); *H01M 10/052* (2013.01); *H01M 10/0525* (2013.01); *H01M 10/0585* (2013.01)

(58) Field of Classification Search
    CPC .... H01M 2/145; H01M 2/1673; H01M 2/168; H01M 2/1686; H01M 10/0413; H01M 10/052; H01M 10/0525; H01M 10/0585
    USPC .......................................................... 429/153
    See application file for complete search history.

(56) References Cited

U.S. PATENT DOCUMENTS

| | | | |
|---|---|---|---|
| 2003/0013012 A1 | 1/2003 | Ahn et al. | |
| 2010/0003590 A1* | 1/2010 | Park | H01M 2/1673 429/144 |
| 2010/0190081 A1* | 7/2010 | Park | H01M 2/206 429/452 |
| 2011/0052964 A1 | 3/2011 | Kim et al. | |
| 2011/0244304 A1* | 10/2011 | Shinyashiki | H01M 2/16 429/139 |
| 2011/0274955 A1 | 11/2011 | Park et al. | |
| 2011/0318630 A1* | 12/2011 | Wakizaka | H01M 2/1653 429/144 |
| 2012/0015236 A1 | 1/2012 | Spare | |
| 2012/0225345 A1 | 9/2012 | Kim | |
| 2013/0004817 A1 | 1/2013 | Lee et al. | |
| 2013/0108906 A1* | 5/2013 | Bhardwaj | H01M 10/0431 429/94 |
| 2013/0216880 A1 | 8/2013 | Park et al. | |
| 2013/0302674 A1* | 11/2013 | Stern | H01M 2/26 429/211 |
| 2014/0023908 A1 | 1/2014 | Ueki et al. | |
| 2014/0134472 A1 | 5/2014 | Kim | |
| 2014/0205879 A1 | 7/2014 | Jang et al. | |
| 2015/0003329 A1 | 1/2015 | Morita | |
| 2015/0191549 A1 | 7/2015 | Kiely et al. | |
| 2015/0214578 A1 | 7/2015 | Spare | |

FOREIGN PATENT DOCUMENTS

| | | | |
|---|---|---|---|
| DE | 102010062143 A1 * | 5/2012 | ............. H01M 2/26 |
| JP | 2000-149994 A | 5/2000 | |
| JP | 2001-167743 A | 6/2001 | |
| JP | 2002-260600 A | 9/2002 | |
| JP | 2003-523060 A | 7/2003 | |
| JP | 2004-111219 A | 4/2004 | |
| JP | 2013-134881 A | 7/2012 | |
| JP | 2013-524460 A | 8/2013 | |
| JP | 2014-175247 A | 9/2014 | |
| KR | 10-2008-0052869 A | 6/2008 | |
| KR | 10-2009-0064021 A | 6/2009 | |
| KR | 10-2011-0105737 A | 9/2011 | |
| KR | 10-2012-0051424 A | 5/2012 | |
| KR | 10-2012-0108212 A | 10/2012 | |
| KR | 10-2013-0051890 A | 5/2013 | |
| WO | WO 2012/009423 A | 1/2012 | |
| WO | WO 2012/131883 A1 | 10/2012 | |
| WO | WO 2013/108906 A1 | 7/2013 | |

* cited by examiner

POUCH TYPE SECONDARY BATTERY

TECHNICAL FIELD

The present invention relates to a pouch type secondary battery, and more particularly, to a pouch type secondary battery having an appropriate structure to improve electrical capacity thereof.

BACKGROUND ART

Korean Patent Publication No. 2008-0052869 discloses a structure of a general secondary battery, and more particularly, a structure of a pouch type secondary battery having a bilateral symmetric and rectangular parallelepiped shape.

FIG. 1 is an exploded perspective view illustrating a pouch type secondary battery in the related art. Referring to FIG. 1, a pouch type secondary battery includes: an electrode assembly 10 having electrode tabs 11 and 12 that protrudes out of the electrode assembly 10; and a pouch exterior part 1 accommodating the electrode assembly 10 in an accommodating part 4 such that portions of electrode leads 13 and 14 connected to the electrode tabs 11 and 12, respectively, are exposed to the outside. The pouch type secondary battery is manufactured by brining an upper case 2 and a lower case 3 into contact with each other with the electrode assembly 10 accommodated in the accommodating part 4 and sealing the upper case 2 and the lower case 3.

FIG. 2 is a partial enlarged view illustrating a space between an electrode assembly and a pouch exterior part, which are included in a pouch type secondary battery in the related art.

A process of forming the accommodating part 4 in the pouch exterior part 1 may use a deep drawing method. An edge of the accommodating part 4 is rounded to prevent a concentration load from breaking the edge in the process. In particular, not only a border between a bottom surface 4B and an inner surface 4A, but also horizontal and vertical portions of the inner surface 4A are rounded. However, vertexes of the electrode assembly 10 have a right angle as illustrated in FIG. 2.

The electrode assembly 10 should be spaced apart from the pouch exterior part 1 by at least a specific distance to prevent short-circuiting. In addition, since a distance $D_0$ between the vertexes of the electrode assembly 10 and the inner surface 4A is the minimum distance between the electrode assembly 10 and the accommodating part 4, the distance $D_0$ should be equal to or great than a minimum distance needed for preventing short-circuiting.

However, since a distance $D_1$ between a side of the electrode assembly 10 and the inner surface 4A of the pouch exterior part 1 is significantly greater than the distance $D_0$ as illustrated in FIG. 2, the distance $D_1$ is significantly greater than the minimum distance needed for preventing short-circuiting.

Thus, the volume of the electrode assembly 10 accommodated in the accommodating part 4 is significantly smaller than the volume of the accommodating part 4, which delimits electrical capacity of the pouch type secondary battery.

DISCLOSURE OF THE INVENTION

Technical Problem

Accordingly, the present invention aims at providing a pouch type secondary battery having an appropriate structure to improve electrical capacity thereof.

Technical Solution

According to an aspect of the present invention, there is provided a pouch type secondary battery including an electrode assembly accommodated in an accommodating part of a pouch exterior part, wherein a vertex part of an inner surface of the accommodating part is rounded, the electrode assembly includes a unit stack part that has a structure (a) in which a type of radical units are repeatedly disposed, wherein electrodes and separators are alternately disposed and are integrally coupled in the radical units, and the number of the electrodes is the same as the number of the separators, or a structure (b) in which two or more types of radical units are disposed in a predetermined order, wherein electrodes and separators are alternately disposed and are integrally coupled in the radical units, and the number of the electrodes is the same as the number of the separators, distal ends of neighboring ones of the separators are not adhered to each other, the type of the radical units of the structure (a) have a four-layer structure formed by sequentially stacking a first electrode, a first separator, a second electrode, and a second separator, or a structure formed by repeatedly stacking the four-layer structure, when the two or more types of the radical units of the structure (b) are stacked one by one in the predetermined order, the four-layer structure or the structure formed by repeatedly stacking the four-layer structure is formed, and vertex parts of the separators are rounded to correspond to the vertex part of the inner surface of the accommodating part.

Advantageous Effects

According to the present invention, provided is a pouch type secondary battery having an appropriate structure to improve electrical capacity thereof.

MODE FOR CARRYING OUT THE INVENTION

Figure 1:
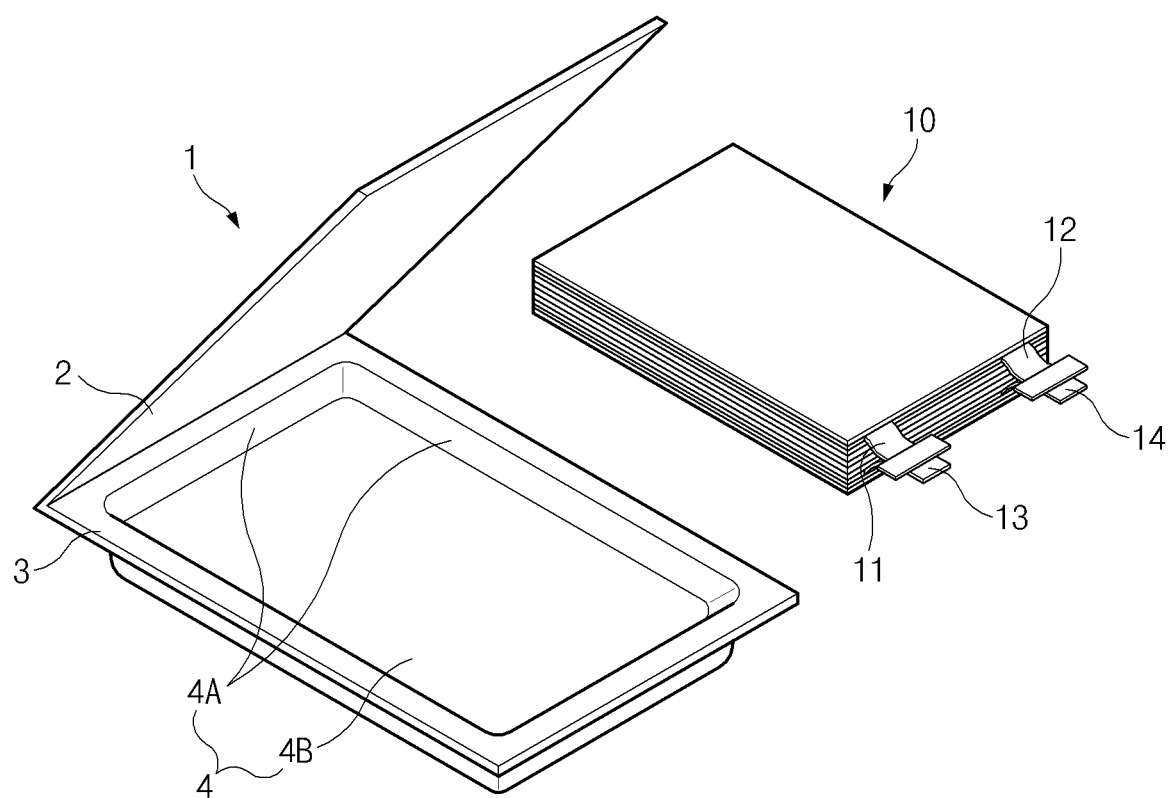
FIG. 1 is an exploded perspective view illustrating a pouch type secondary battery in the related art.

Hereinafter, preferred embodiments of the present invention will be described in detail with reference to the accompanying drawings. However, the present invention is not limited to the following embodiments.

Terms used in the following description and scopes of claims are not limited to terms that have been in dictionaries, and are used only for explaining specific exemplary embodiments while not limiting the present invention.

In the drawings, the size of each element or a specific part that constitutes the element is exaggerated, omitted, or schematically illustrated for convenience in description and clarity. Also, the size of each element does not entirely reflect an actual size. Moreover, detailed descriptions related to well-known functions or configurations will be ruled out in order not to unnecessarily obscure subject matters of the present invention.

Figure 3:
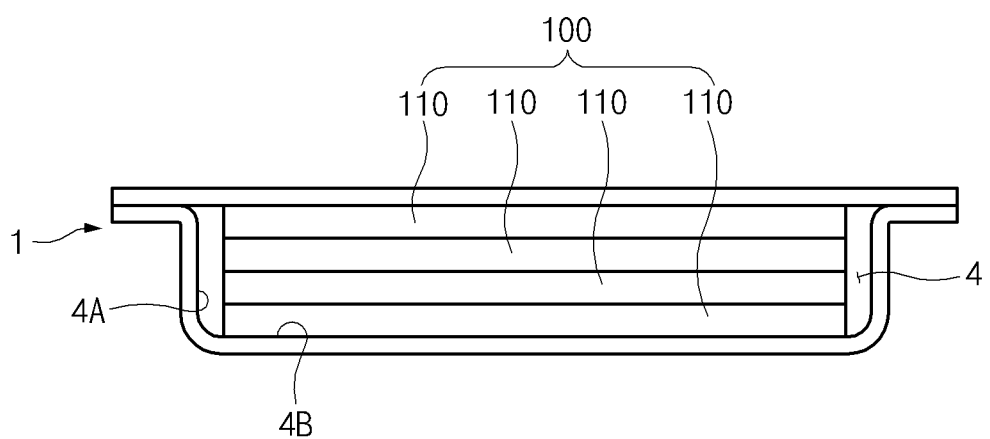
FIG. 3 is a vertical cross-sectional view illustrating a pouch type secondary battery according to an embodiment of the present invention.
Figure 4:
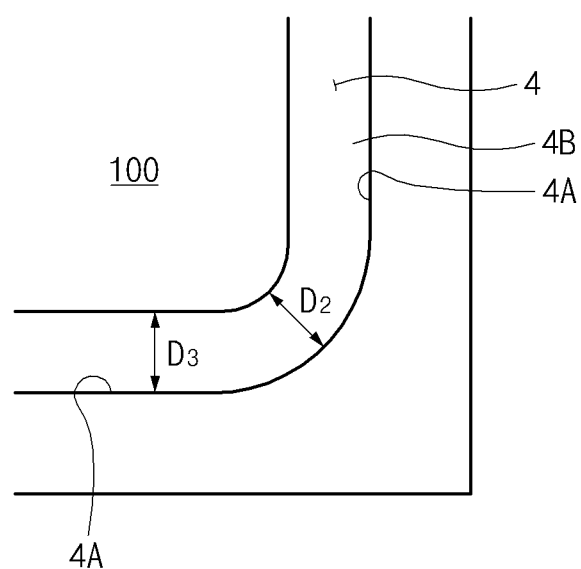
FIG. 4 is a partial enlarged view illustrating a space between an electrode assembly and a pouch exterior part, which are included in the pouch type secondary battery, according to the current embodiment.

FIG. 3 is a vertical cross-sectional view illustrating a pouch type secondary battery according to an embodiment of the present invention. FIG. 4 is a partial enlarged view illustrating a space between an electrode assembly and a pouch exterior part, which are included in the pouch type secondary battery, according to the current embodiment.

Referring to FIGS. 3 and 4, a pouch type secondary battery according to the current embodiment includes: an accommodating part having an inner surface 4A, a vertex part of which is rounded; and an electrode assembly 100 including a unit stack part that has a structure in which a type of radical units are repeatedly stacked, or a structure in which two or more types of radical units are stacked in a predetermined order, for example, alternately. A detailed structure of radical units 110 is omitted in FIG. 3 that is a schematic view, and will be described later.

Figure 5:
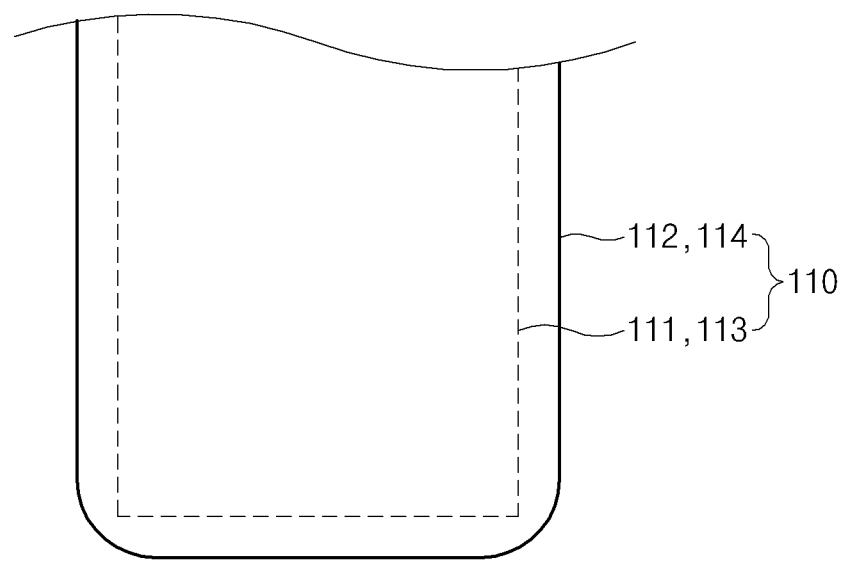
FIG. 5 is a plan view of a radical unit according to the present invention.

Referring to FIGS. 4 and 5, vertex parts of a first separator 112 and a second separator 114, which are provided in the radical unit 110, are rounded to correspond to the vertex part of the inner surface 4A of the accommodating part. Referring to FIG. 5, vertex parts of electrodes 111 and 113 have a right angle, and the vertex parts of the first separator 112 and the second separator 114 are rounded. Alternatively, referring to FIG. 6, the vertex parts of the electrodes 111 and 113 may be rounded as well as the vertex parts of the first separator 112 and the second separator 114.

Figure 6:
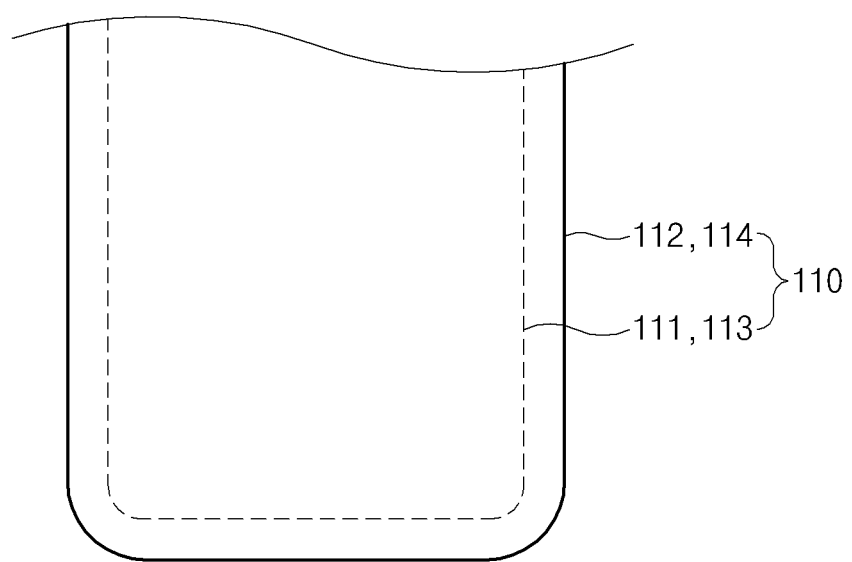
FIG. 6 is a plan view of a radical unit having a different shaped electrode from FIG. 5.

Thermal deformation rates of the first separator 112 and the second separator 114 are greater than those of the electrodes 111 and 113. Thus, when the first and second separators 112 and 114 excessively contract, the electrodes 111 and 113, which may be referred to as first and second electrodes, respectively, may be short-circuited. The possibility of short-circuiting of the first and second electrodes 111 and 113 caused by contraction of the first and second separators 112 and 114 in a structure as illustrated in FIG. 6 is lower than that in a structure as illustrated in FIG. 5. However, this does not mean that the possibility of short-circuiting of the first and second electrodes 111 and 113 caused by contraction of the first and second separators 112 and 114 in the structure as illustrated in FIG. 5 is high.

A process of rounding the vertex parts of the first and second separators 112 and 114 may be performed by cutting the vertex parts of the first and second separators 112 and 114 through laser cutting, ultrasonic cutting, or mold cutting.

Figure 9:
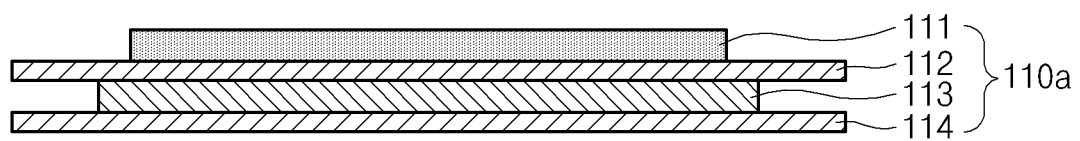
FIG. 9 is a side view illustrating a first structure of a radical unit according to the present invention.
Figure 10:
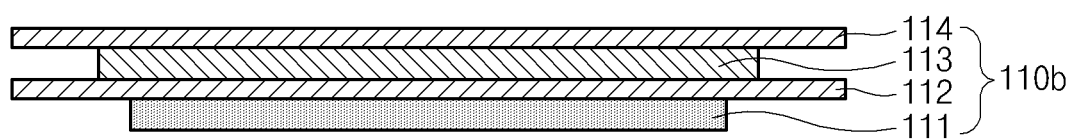
FIG. 10 is a side view illustrating a second structure of a radical unit according to the present invention.

A horizontal (or vertical) size of the first and second separators 112 and 114 is greater than that of the first and second electrodes 111 and 113 (refer to FIGS. 9 and 10). Thus, a horizontal (or vertical) side of the electrode assembly 100 corresponds to that of the first and second separators 112 and 114.

Figure 2:
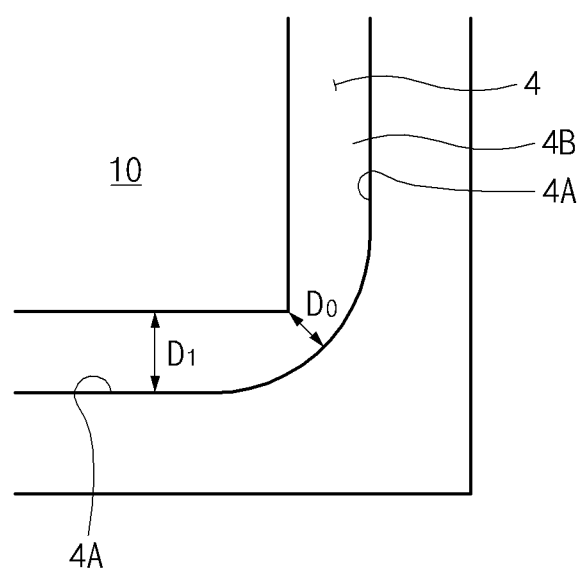
FIG. 2 is a partial enlarged view illustrating a space between an electrode assembly and a pouch exterior part, which are included in a pouch type secondary battery in the related art.

Accordingly, unlike the related art as illustrated in FIG. 2, a distance D3 between the horizontal (or vertical) side of the electrode assembly 100 and the inner surface 4A of the accommodating part is not significantly different from a distance D2 between a vertex of the electrode assembly 100 and the inner surface 4A of the accommodating part, and the distances D2 and D3 are smaller than those in the related art. Thus, the electrical capacity of the pouch type secondary battery can be higher than that of a secondary battery in the related art.

The distances D2 and D3 may be the same in order to maximize the electrical capacity. The meaning that the distances D2 and D3 are the same is not limited to the meaning that the distances D2 and D3 are mathematically or literally the same, and may be thus the meaning that the distances D2 and D3 seem to be substantially the same to the human eye.

Figure 7:
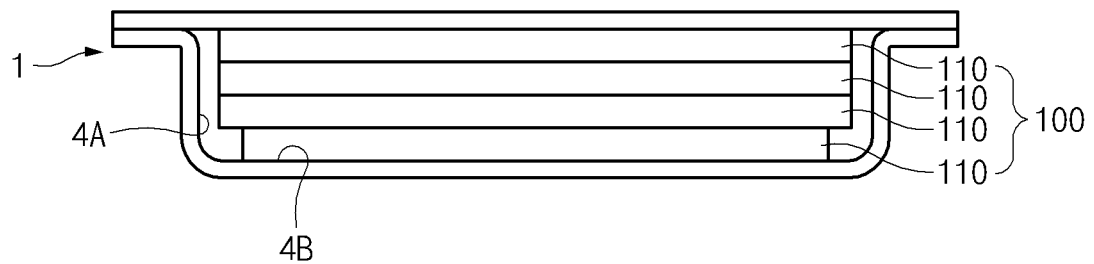
FIG. 7 is a vertical cross-sectional view illustrating a pouch type secondary battery having small radical units as a configuration according to an embodiment of the present invention.

FIG. 7 is a vertical cross-sectional view illustrating a pouch type secondary battery having small radical units as a configuration according to an embodiment of the present invention.

Referring to FIG. 7, the horizontal and vertical sizes of the radical unit 110 adjacent to a bottom surface 4B of the accommodating part may be smaller than those of the other radical units 110 while the radical units 110 of the electrode assembly 100 have the same horizontal and vertical sizes as illustrated in FIG. 3. The radical unit 110, the horizontal and vertical sizes of which are smaller than those of the other radical units 110, may be referred to as a small radical unit.

Specifically, when an edge where the inner surface 4A and the bottom surface 4B of the accommodating part formed in a pouch exterior part 1 meet each other is rounded, the electrode assembly 100 may include the small radical unit. In this case, the electrical capacity of the pouch type secondary battery can be more efficiently maximized, which will now be described.

Referring to FIG. 7, when the number of the radical units 110 included in the electrode assembly 100 is four, the three upper ones of the radical units 110 are assumed to be spaced apart from the inner surface 4A by an optimal distance. Unlike a configuration as illustrated in FIG. 7, if the lowest one of the radical units 110 is not the small radical unit and has the same size as that of the other three radical units 110, the lowest radical unit 110 may be excessively close to the inner surface 4A, or the possibility of contacting the inner surface 4A may be increased. In this case, the possibility that the electrode assembly 100 and the pouch exterior part 1 are short-circuited is increased. Thus, when the edge where the inner surface 4A and the bottom surface 4B of the accommodating part meet each other is rounded, the electrode assembly 100 may have the small radical unit. Specifically, the radical unit 110 adjacent to the bottom surface 4B may be the small radical unit.

Figure 8:
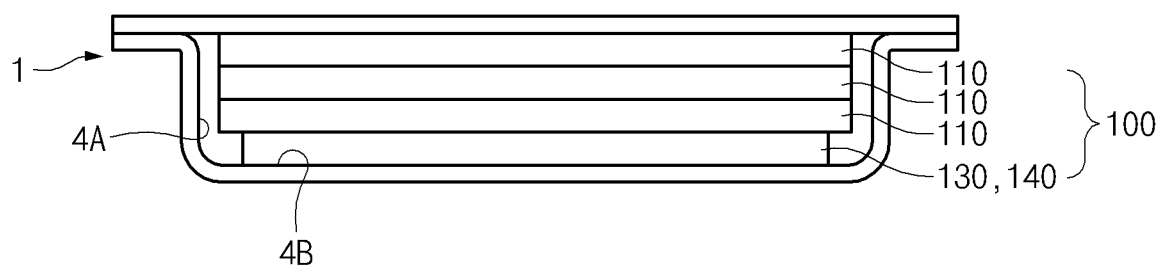
FIG. 8 is a vertical cross-sectional view illustrating a pouch type secondary battery including a small auxiliary unit as a configuration according to an embodiment of the present invention.

FIG. 8 is a vertical cross-sectional view illustrating a pouch type secondary battery including a small auxiliary unit as a configuration according to an embodiment of the present invention, and an electrode assembly 100 may include auxiliary units 130 and 140 as well as radical units 110, which will be described later in detail. A detailed configuration of the auxiliary units 130 and 140 will be described later, and vertex parts of the auxiliary units 130 and 140, like vertex parts of the radical units 110, are also rounded to correspond to a vertex part of an inner surface 4A of an accommodating part.

An edge where the inner surface 4A and a bottom surface 4B of the accommodating part meet each other may be rounded, and the auxiliary units 130 and 140 may face the bottom surface 4B. In this case, the auxiliary units 130 and 140 may be formed as small auxiliary units, vertical and horizontal sizes of which are smaller than those of the three radical units 110 of FIG. 8, as described with reference to FIG. 7.

Unlike a configuration as illustrated in FIG. 8, the auxiliary units 130 and 140 may be disposed in the uppermost layer of the electrode assembly 100, and the other layers of the electrode assembly 100 may be constituted by the radical units 110. In this case, the radical unit 110 facing the bottom surface 4B of the accommodating part may be formed as a small radical unit, and the auxiliary units 130 and 140 may have a general size.

Alternatively, the auxiliary units 130 and 140 may be disposed in the uppermost layer and the lowermost layer of the electrode assembly 100, and the other layers of the electrode assembly 100 may be constituted by the radical units 110. In this case, only one of the auxiliary units 130 and 140, which faces the bottom surface 4B of the accommodating part, may be formed as a small auxiliary unit, and the other of the auxiliary units 130 and 140 and the radical units 110 may have the general size.

The radical unit 110 has a stacked structure in which the first electrode 111, the first separator 112, the second electrode 113, and the second separator 114 are sequentially stacked. However, a specific process of fixing relative positions of separate layers to constitute the radical unit 110 or the electrode assembly 100 including the radical unit 110 is not described in detail yet.

Thus, an actual process of forming the radical unit 110, and various structure of the electrode assembly 100 will now be described.

[Structure of Radical Unit]

A radical unit of an electrode assembly according to the present invention is formed by alternately disposing electrodes and separators. The number of the electrodes is the same as the number of the separators. For example, referring to FIG. 9, a radical unit 110a may be formed by stacking first and second electrodes 111 and 113 and first and second separators 112 and 114. In this case, a cathode and an anode may face each other with a separator therebetween. When the radical unit is formed as such, an electrode (refer to the electrode 111 illustrated in FIGS. 9 and 10) is disposed at the distal end of a side of the radical unit, and a separator (refer to the separator 114 illustrated in FIGS. 9 and 10) is disposed at the distal end of another side of the radical unit.

A unit stack part (that is, the electrode assembly) may be formed just by stacking radical units. That is, a unit stack part may be formed by repeatedly stacking one type of radical units or stacking two or more types of radical units in a predetermined order. To this end, the radical units may have the following structure.

First, a radical unit may be formed by sequentially stacking a first electrode, a first separator, a second electrode, and a second separator. In more particular, referring to FIG. 9, the radical unit 110a may be formed by sequentially stacking the first electrode 111, the first separator 112, the second electrode 113, and the second separator 114 from the upper side of the radical unit 110a to the lower side thereof. Alternatively, referring to FIG. 10, a radical unit 110b may be formed by sequentially stacking the first electrode 111, the first separator 112, the second electrode 113, and the second separator 114 from the lower side of the radical unit 110b to the upper side thereof. Hereinafter, a radical unit having such a structure will be referred to as a first radical unit. The pole of the first electrode 111 is opposite to the pole of the second electrode 113. For example, when the first electrode 111 is a cathode, the second electrode 113 is an anode.

Figure 11:
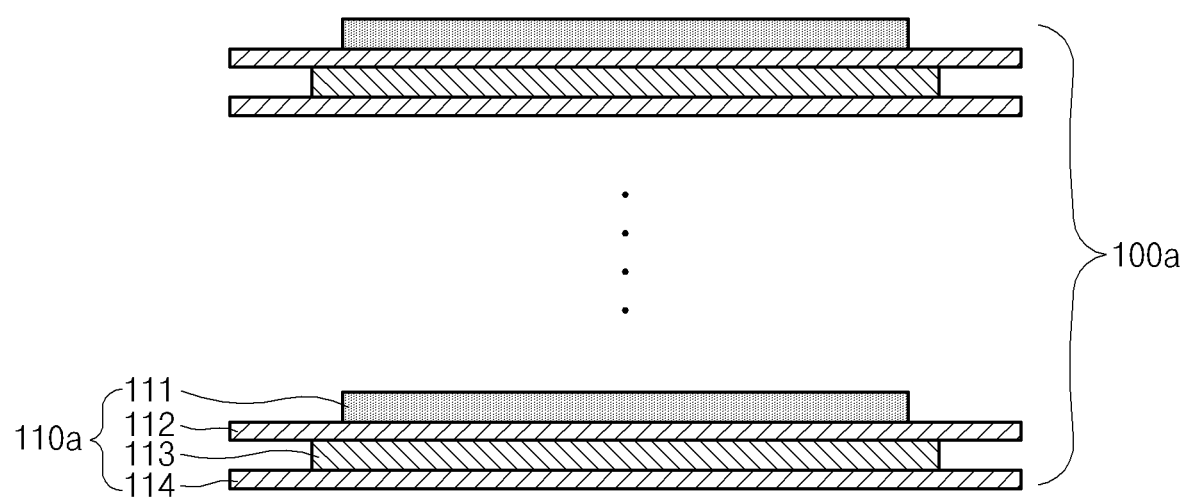
FIG. 11 is a side view illustrating a unit stack part formed by repeatedly stacking the radical unit of FIG. 9.

As such, since a radical unit is formed by sequentially stacking a first electrode, a first separator, a second electrode, and a second separator, a unit stack part 100a may be formed just by repeatedly stacking one type of radical units 110a, as illustrated in FIG. 11. Furthermore, a radical unit may have an eight-layer or twelve-layer structure as well as such a four-layer structure. That is, a radical unit may have a structure formed by repeatedly stacking the four-layer structure. For example, a radical unit may be formed by sequentially stacking a first electrode, a first separator, a second electrode, a second separator, the first electrode, the first separator, the second electrode, and the second separator.

Secondly, a radical unit may be formed by sequentially stacking a first electrode, a first separator, a second electrode, a second separator, the first electrode, and the first separator, or the second electrode, the second separator, the first electrode, the first separator, the second electrode, and the second separator. Hereinafter, the radical unit formed by sequentially stacking the first electrode, the first separator, the second electrode, the second separator, the first electrode, and the first separator will be referred to as a second radical unit, and the radical unit formed by sequentially stacking the second electrode, the second separator, the first electrode, the first separator, the second electrode, and the second separator will be referred to as a third radical unit.

Figure 12:
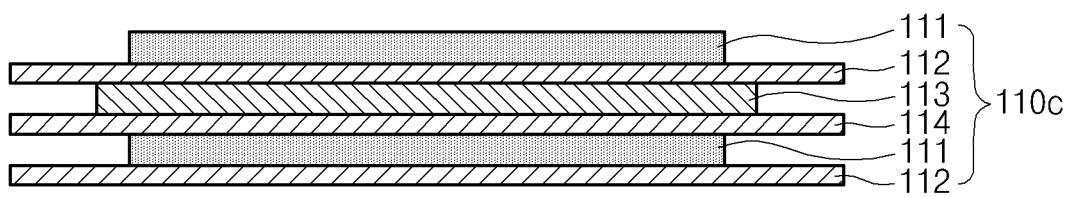
FIG. 12 is a side view illustrating a third structure of a radical unit according to the present invention.
Figure 13:
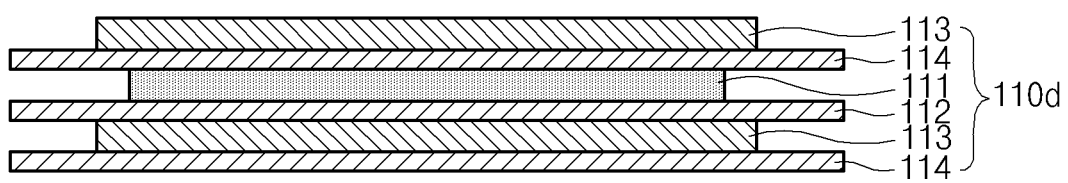
FIG. 13 is a side view illustrating a fourth structure of a radical unit according to the present invention.

In more particular, referring to FIG. 12, a second radical unit 110c may be formed by sequentially stacking the first electrode 111, the first separator 112, the second electrode 113, the second separator 114, the first electrode 111, and the first separator 112 from the upper side of the second radical unit 110c to the lower side thereof. In addition, referring to FIG. 13, a third radical unit 110d may be formed by sequentially stacking the second electrode 113, the second separator 114, the first electrode 111, the first separator 112, the second electrode 113, and the second separator 114 from the upper side of the third radical unit 110d to the lower side thereof. The order from the upper side to the lower side may be reversed.

Figure 14:
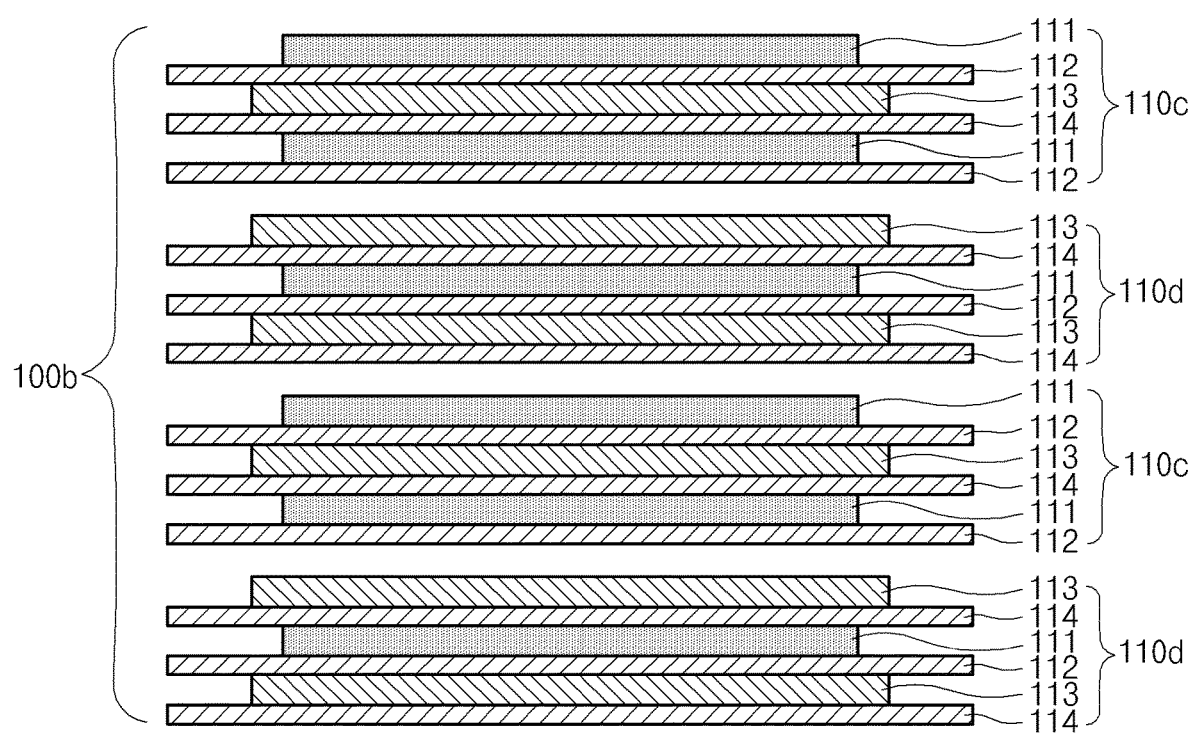
FIG. 14 is a side view illustrating a unit stack part formed by stacking the radical units of FIGS. 5 and 12.

When the second radical unit 110c and the third radical unit 110d are stacked, a structure including repeatedly stacked four-layer structures is formed. Thus, referring to FIG. 14, a unit stack part 100b may be formed just by alternately stacking second radical units 110c and third radical units 110d one by one.

As such, one type of radical units have the four-layer structure formed by sequentially stacking the first electrode, the first separator, the second electrode, and the second separator, or the structure formed by repeatedly stacking the four-layer structure. In addition, two or more types of radical units are stacked one by one in a predetermined order to form the four-layer structure or the structure formed by repeatedly stacking the four-layer structure. For example, the first radical unit has the four-layer structure, and a stack of the second and third radical units has a twelve-layer structure formed by repeatedly stacking the four-layer structure.

Thus, a unit stack part (that is, an electrode assembly) according to the present invention may be formed just by repeatedly stacking one type of radical units or stacking two or more types of radical units in a predetermined order.

Each of the radical units stacked to form the unit stack part is used as a unit. That is, the radical units are manufactured and are then stacked repeatedly or in the predetermined order to form the unit stack part. As such, a unit stack part according to the present invention may be formed just by stacking radical units. Thus, according to the present invention, radical units can be very accurately aligned. Accordingly, electrodes and separators can also be accurately aligned in a unit stack part. In addition, according to the present invention, unit stack parts (electrode assemblies) can be produced very efficiently since processes are significantly simplified.

[Manufacturing of Radical Unit]

Figure 15:
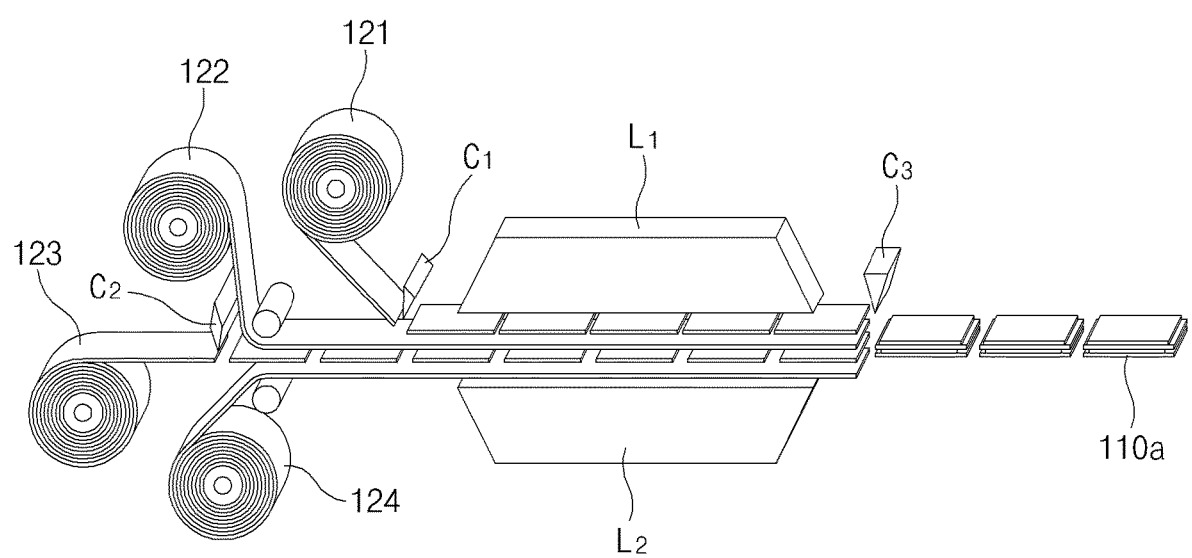
FIG. 15 is a view illustrating a process of manufacturing radical units according to the present invention.

Referring to FIG. 15, a process of manufacturing the first radical unit will now be representatively described. First, a first electrode raw material 121, a first separator raw material 122, a second electrode raw material 123, and a second separator raw material 124 are prepared. The first and second separator raw materials 122 and 124 may be the same. Then, the first electrode raw material 121 is cut to a predetermined size using a cutter C1, and the second electrode raw material 123 is cut to a predetermined size using a cutter C2. Then, the first electrode raw material 121 is placed as a layer on the first separator raw material 122, and the second electrode raw material 123 is placed as a layer on the second separator raw material 124.

Then, the first electrode raw material 121, the first separator raw material 122, the second electrode raw material 123, and the second separator raw material 124 may be adhered to one another by laminators L1 and L2. Such adhesion forms a radical unit in which electrodes and separators are integrally coupled. Various methods may be used to couple the electrodes and the separators. The laminators L1 and L2 press a raw material to be adhered, or press and heat a raw material to be adhered. Such adhesion further facilitates stacking of radical units when manufacturing a unit stack part. In addition, the adhesion facilitates alignment of the radical units. After the adhesion, the first separator raw material 122 and the second separator raw material 124 are cut to a predetermined size using a cutter C3 to manufacture the radical units 110a. During such a process, distal ends of neighboring separators are not adhered to each other.

As such, an electrode of a radical unit is adhered to a separator adjacent to the electrode. Alternatively, the separator may be adhered to the electrode. A surface of the electrode facing the separator may be entirely adhered to the separator. Accordingly, the electrode is stably fixed to the separator. The electrode may be smaller than the separator.

An adhesive may be applied to the separator in order to adhere the electrode to the separator. The adhesive may be applied in a mesh or dot shape to an adhesion surface. This is because if the adhesive is entirely and closely applied to the whole of the adhesion surface, reactive ions such as lithium ions cannot pass through the separator. Thus, even though the electrode is entirely adhered to the separator (that is, to the whole of the adhesion surface) by the adhesive, the electrode is not closely adhered thereto.

Alternatively, the electrode may be entirely adhered to a separator including a coating layer having adhesive force. In particular, the separator may include a porous separator base material such as a polyolefin-based separator base material, and a porous coating layer that is formed on the whole of one or both surfaces of the separator base material. The coating layer may be formed of a mixture of inorganic particles and a binder polymer that connects and fixes the inorganic particles to one another.

The inorganic particles may improve thermal stability of the separator. That is, the inorganic particles may prevent the separator from contracting at a high temperature. The binder polymer may improve mechanical stability of the separator by fixing the inorganic particles. In addition, the binder polymer may adhere the electrode to the separator. Since the binder polymer is distributed in the whole of the coating layer, the electrode is closely adhered to the whole of the adhesion surface by the binder polymer, unlike the above described adhesive. Thus, the electrode is more stably fixed to the separator including the coating layer. The above described laminators may be used to improve the adhesion of the electrode to the separator.

The inorganic particles may constitute a densely packed structure to form interstitial volumes between the inorganic particles in the whole of the coating layer. The interstitial volumes defined by the inorganic particles may form a porous structure in the coating layer. Even though the coating layer is formed in the separator, the porous structure allows lithium ions to efficiently pass through the separator. For reference, the interstitial volumes defined by the inorganic particles may be clogged with the binder polymer according to locations of the interstitial volumes.

The densely packed structure may be described as a structure in which pebbles are contained in a glass bottle. Thus, when the inorganic particles constitute the densely packed structure, the interstitial volumes between the inorganic particles are formed in the whole of the coating layer, not in a portion of the coating layer. Thus, as the size of the inorganic particles increases, the size of pores also increases according to the interstitial volumes. The densely packed structure allows the lithium ions to efficiently pass through the separator through the all surfaces thereof.

Radical units of a unit stack part may be adhered to each other. For example, referring to FIG. 9, when an adhesive or the above-described coating layer is applied to the lower surface of the second separator 114, another radical unit may be adhered to the lower surface of the second separator 114.

In this case, adhesive force between an electrode and a separator of the radical unit may be greater than adhesive force between the radical units of a unit stack part. Alternatively, there may be no adhesive force between the radical units. In this case, the possibility that an electrode assembly (the unit stack part) is disassembled into the radical units in an electrode assembly disassembling process is increased because of a difference in adhesive force. For reference, the adhesive force may be expressed as peeling force. For example, adhesive force between an electrode and a separator may be expressed as force needed to detach the electrode and the separator from each other. As such, neighboring radical units in a unit stack part may not be coupled to each other, or be coupled to each other by coupling force that is different from coupling force between an electrode and a separator in the radical units.

For reference, when a separator includes the above-described coating layer, ultrasonic welding may be undesirable for the separator. A separator may be greater than an electrode. Thus, a distal end of the first separator 112 may be coupled to a distal end of the second separator 114 through ultrasonic welding. The ultrasonic welding requires a horn that directly presses an object. However, if the horn directly presses a distal end of a separator, the horn may be adhered to the separator by the coating layer having adhesive force, which may cause a device failure.

[Auxiliary Unit]

A unit stack part may further include at least one of a first auxiliary unit and a second auxiliary unit. First, the first auxiliary unit will now be described. According to the present invention, a radical unit may include an electrode at the distal end of a side thereof, and a separator at the distal end of another side thereof. Thus, when radical units are sequentially stacked, an electrode (refer to an electrode 116 illustrated in FIG. 16, which is referred to as "a distal end electrode" hereinafter) is disposed on the uppermost or lowermost side of a unit stack part. The first auxiliary unit is additionally disposed as a layer on the distal end electrode.

Figure 16:
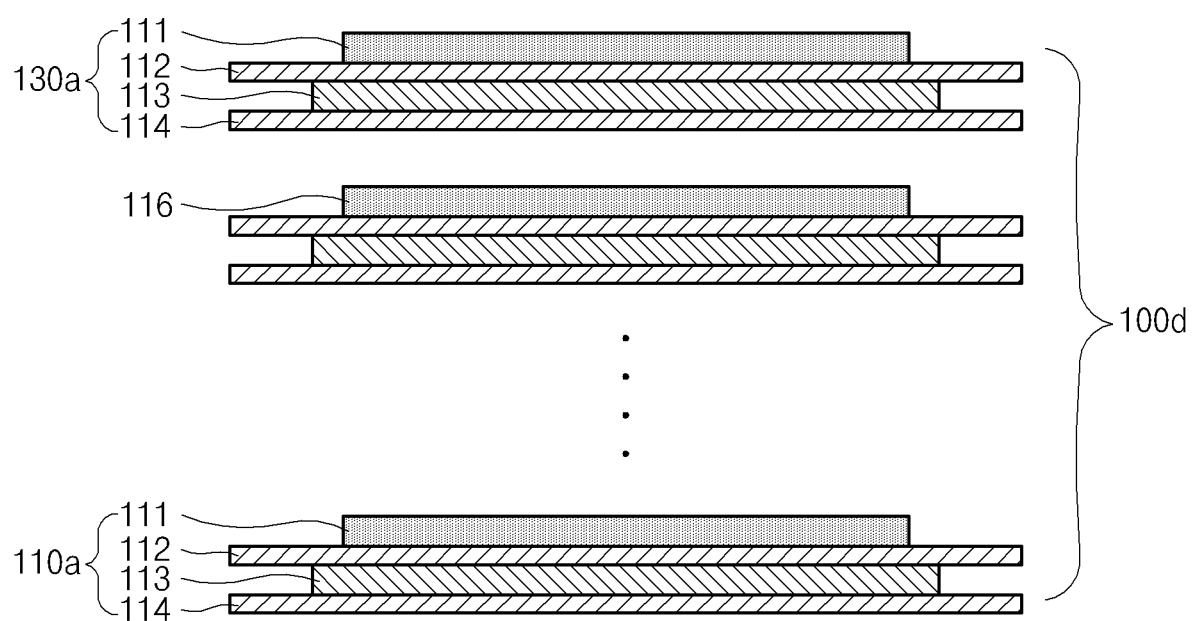
FIG. 16 is a side view illustrating a first structure of a unit stack part including radical units and a first auxiliary unit according to the present invention.

In more particular, referring to FIG. 16, when the distal end electrode 116 is a cathode, a first auxiliary unit 130a may be formed by sequentially stacking a separator 114, an anode 113, a separator 112, and a cathode 111 from the distal end electrode 116, that is, outwardly from the distal end electrode 116. In addition, referring to FIG. 17, when the distal end electrode 116 is an anode, a first auxiliary unit 130b may be formed by sequentially stacking a separator 114 and a cathode 113 from the distal end electrode 116, that is, outwardly from the distal end electrode 116.

Figure 17:
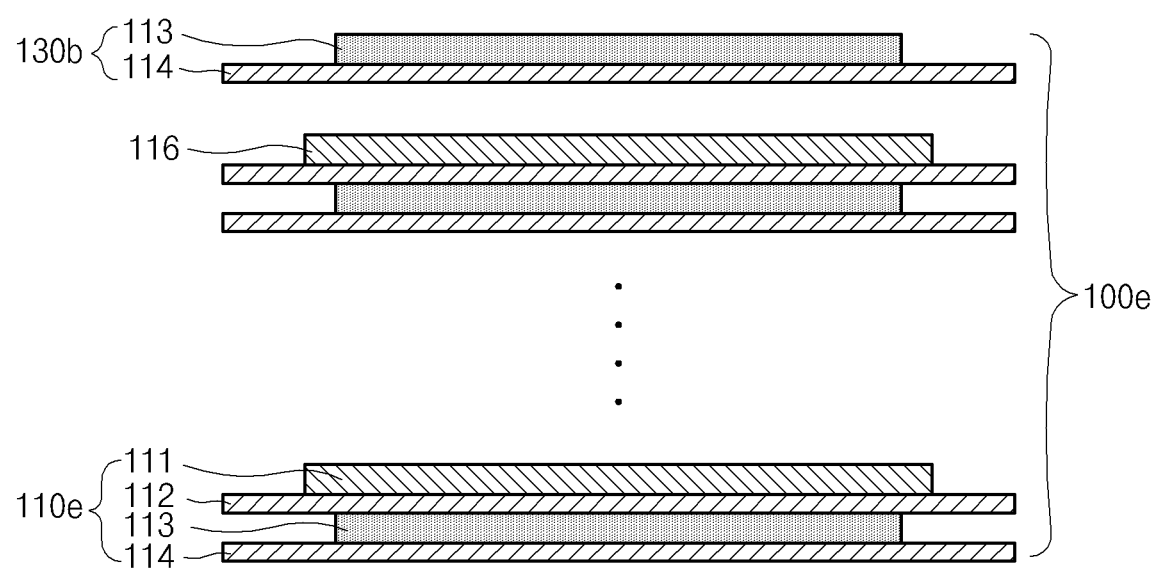
FIG. 17 is a side view illustrating a second structure of a unit stack part including radical units and a first auxiliary unit according to the present invention.

Referring to FIGS. 16 and 17, the cathodes 111 and 113 may be disposed on the outermost distal end electrode side of unit stack parts 100d and 100e by using the first auxiliary units 130a and 130b. In this case, the outermost cathode, that is, the cathode of the first auxiliary unit includes a collector, and only one surface of the collector facing the radical units (only a surface facing the lower side of FIG. 16) may be coated with an active material layer. Then, there is no active material layer on the outermost distal end electrode side, thus saving an active material layer. For reference, since a cathode is a configuration for discharging, for example, lithium ions, when the cathode is disposed on the outermost side of an electrode assembly, battery capacity is improved.

Next, the second auxiliary unit will now be described. The second auxiliary unit basically performs the same function as that of the first auxiliary unit. In particular, according to the present invention, a radical unit may include an electrode at the distal end of a side thereof, and a separator at the distal end of another side thereof. Thus, when radical units are sequentially stacked, a separator (refer to a separator 117 illustrated in FIG. 18, which is referred to as "a distal end separator" hereinafter) is disposed on the uppermost or lowermost side of a unit stack part. The second auxiliary unit is additionally disposed as a layer on the distal end separator.

Figure 18:
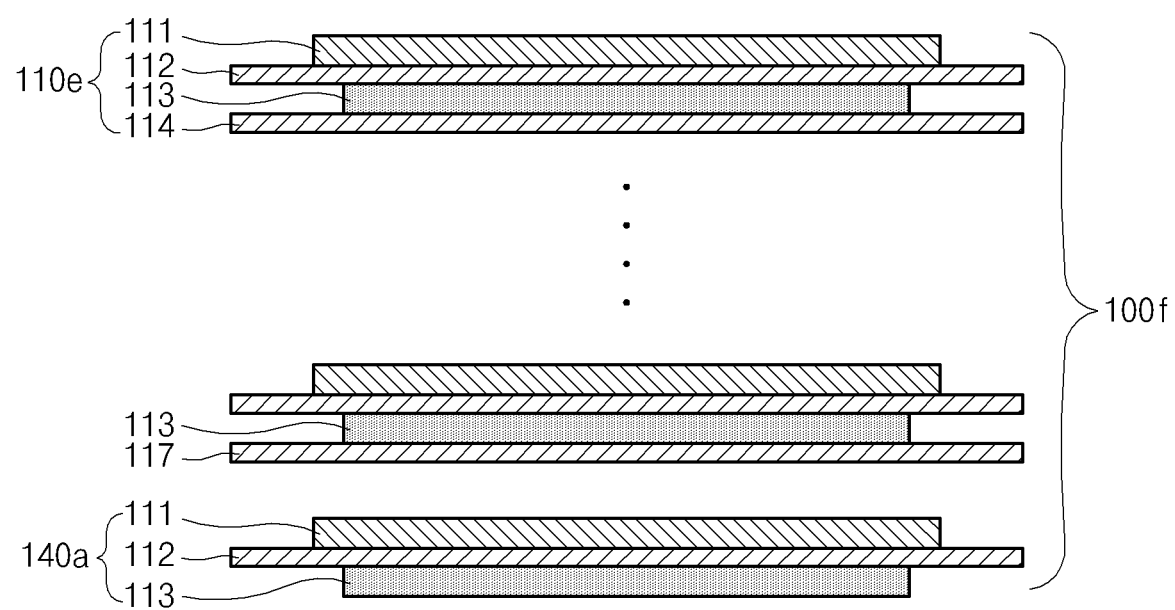
FIG. 18 is a side view illustrating a third structure of a unit stack part including radical units and a second auxiliary unit according to the present invention.

In more particular, referring to FIG. 18, when an electrode 113 contacting the distal end separator 117 of a radical unit is a cathode, a second auxiliary unit 140a may be formed by sequentially stacking an anode 111, a separator 112, and a cathode 113 from the distal end separator 117. In addition, referring to FIG. 19, when an electrode 113 contacting the distal end separator 117 of a radical unit is an anode, a second auxiliary unit 140b may be formed as a cathode 111.

Figure 19:
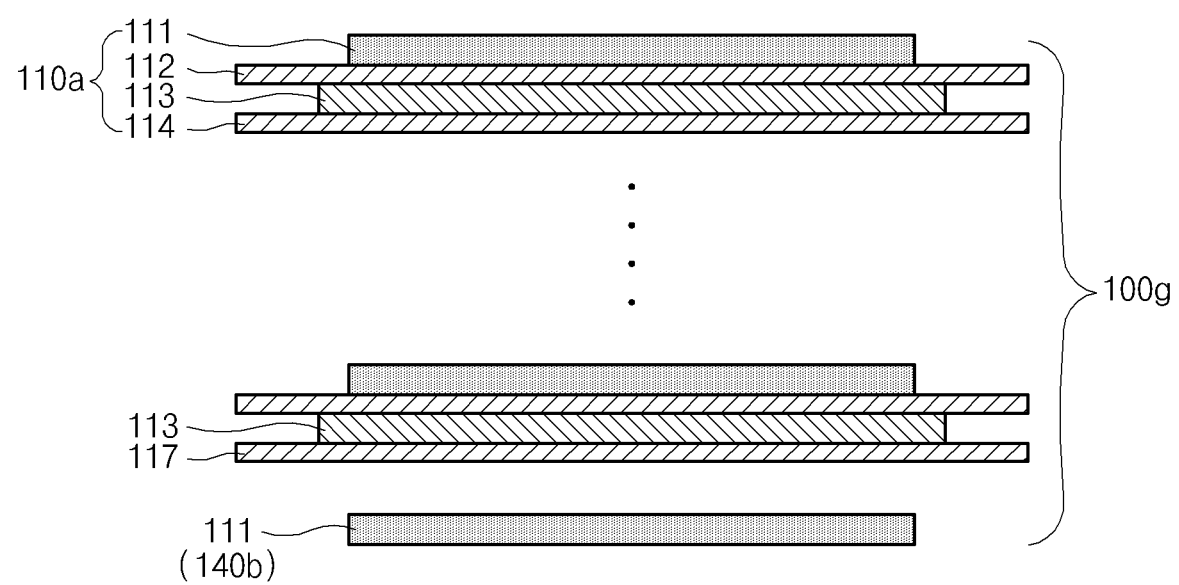
FIG. 19 is a side view illustrating a fourth structure of a unit stack part including radical units and a second auxiliary unit according to the present invention.

Referring to FIGS. 18 and 19, the cathodes 113 and 111 may be disposed on the outermost distal end separator side of unit stack parts 100f and 100g by using the second auxiliary units 140a and 140b. In this case, the outermost cathode, that is, the cathode of the second auxiliary unit includes a collector, as in the cathode of the first auxiliary unit, and only one surface of the collector facing the radical units (only a surface facing the upper side of FIG. 18) may be coated with an active material layer.

Figure 20:
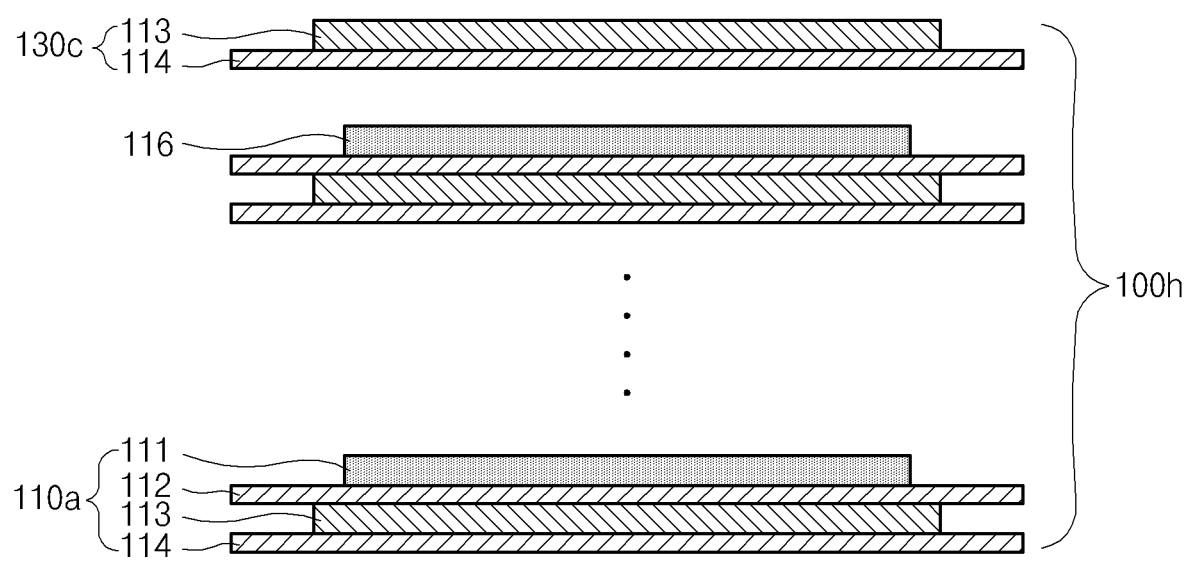
FIG. 20 is a side view illustrating a fifth structure of a unit stack part including radical units and a first auxiliary unit according to the present invention.

However, the first and second auxiliary units may have structures different from structures as described above. First, the first auxiliary unit will now be described. Referring to FIG. 20, when a distal end electrode 116 is a cathode, a first auxiliary unit 130c may be formed by sequentially stacking a separator 114 and an anode 113 from the distal end electrode 116. In addition, referring to FIG. 21, when a distal end electrode 116 is an anode, a first auxiliary unit 130d may be formed by sequentially stacking a separator 114, a cathode 113, a separator 112, and an anode 111 from the distal end electrode 116.

Figure 21:
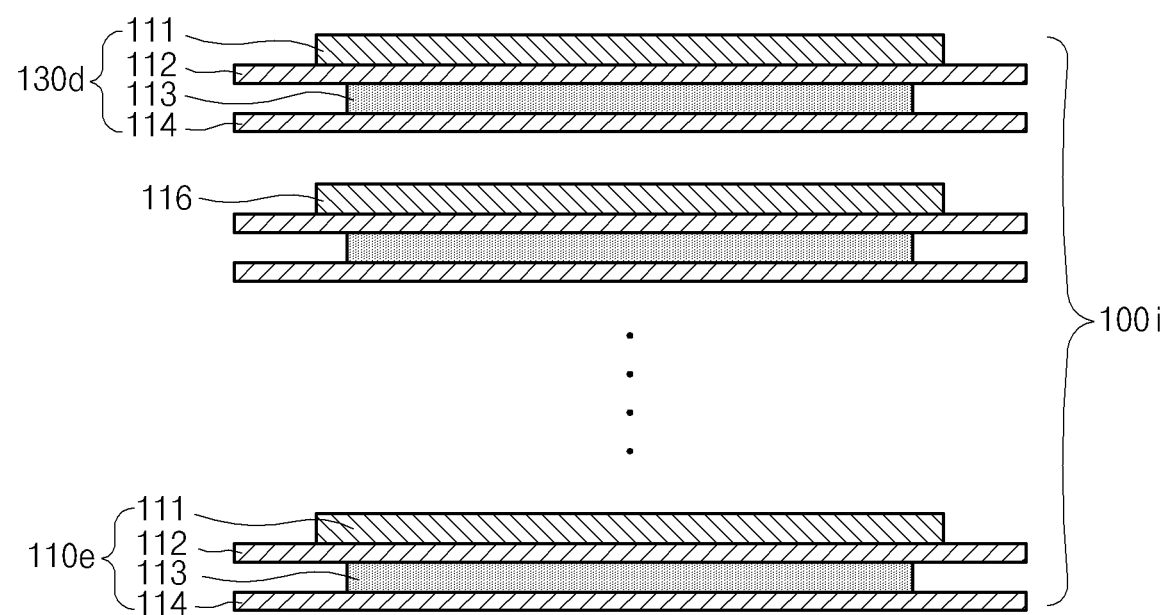
FIG. 21 is a side view illustrating a sixth structure of a unit stack part including radical units and a first auxiliary unit according to the present invention.

Referring to FIGS. 20 and 21, the anodes 113 and 111 may be disposed on the outermost distal end electrode side of unit stack parts 100h and 100i by using the first auxiliary units 130c and 130d.

Figure 22:
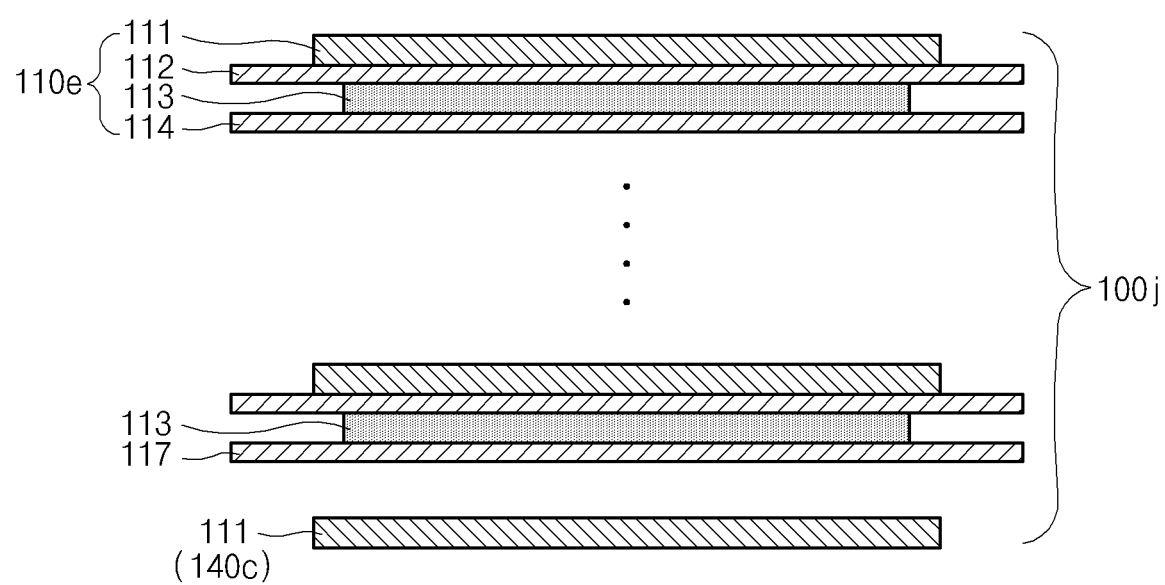
FIG. 22 is a side view illustrating a seventh structure of a unit stack part including radical units and a second auxiliary unit according to the present invention.
Figure 23:
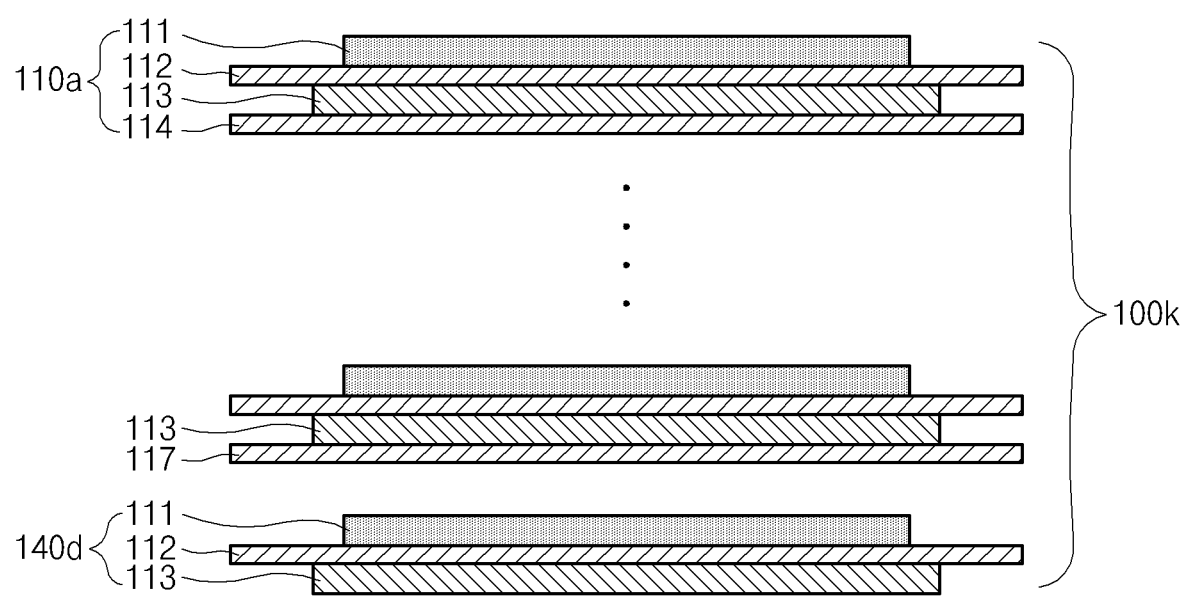
FIG. 23 is a side view illustrating an eighth structure of a unit stack part including radical units and a second auxiliary unit according to the present invention.

Next, the second auxiliary unit will now be described. Referring to FIG. 22, when an electrode 113 contacting a distal end separator 117 of a radical unit is a cathode, a second auxiliary unit 140c may be formed as an anode 111. In addition, referring to FIG. 23, when an electrode 113 contacting a distal end separator 117 of a radical unit is an anode, a second auxiliary unit 140d may be formed by sequentially stacking a cathode 111, a separator 112, and an anode 113 from the distal end separator 117. Referring to FIGS. 22 and 23, the anodes 111 and 113 may be disposed on the outermost distal end separator side of unit stack parts 100j and 100k by using the second auxiliary units 140c and 140d.

Figure 24:
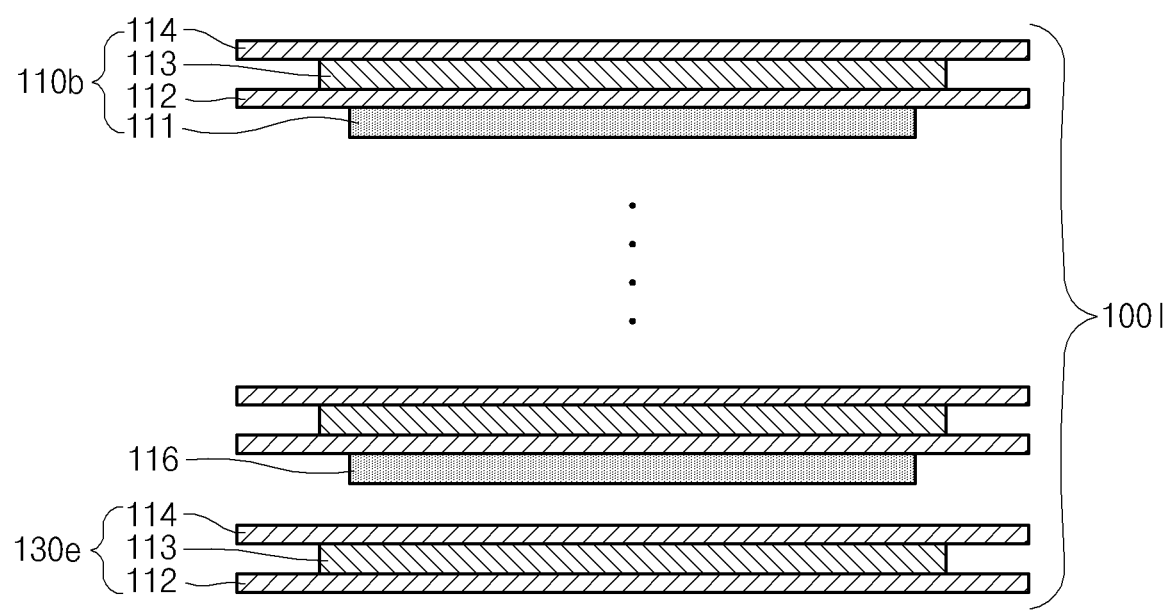
FIG. 24 is a side view illustrating a ninth structure of a unit stack part including radical units and a first auxiliary unit according to the present invention.

For reference, an anode may react with an aluminum layer of a battery case (for example, a pouch type case) due to a potential difference therebetween. Thus, the anode may be insulated from the battery case by a separator. To this end, first and second auxiliary units as illustrated in FIGS. 20 to 23 may further include a separator on an outer side of an anode. For example, unlike the first auxiliary unit 130c illustrated in FIG. 20, a first auxiliary unit 130e illustrated in FIG. 24 may further include a separator 112 on an outermost side thereof. For reference, when an auxiliary unit includes a separator, the auxiliary unit is more easily aligned with a radical unit.

Figure 25:
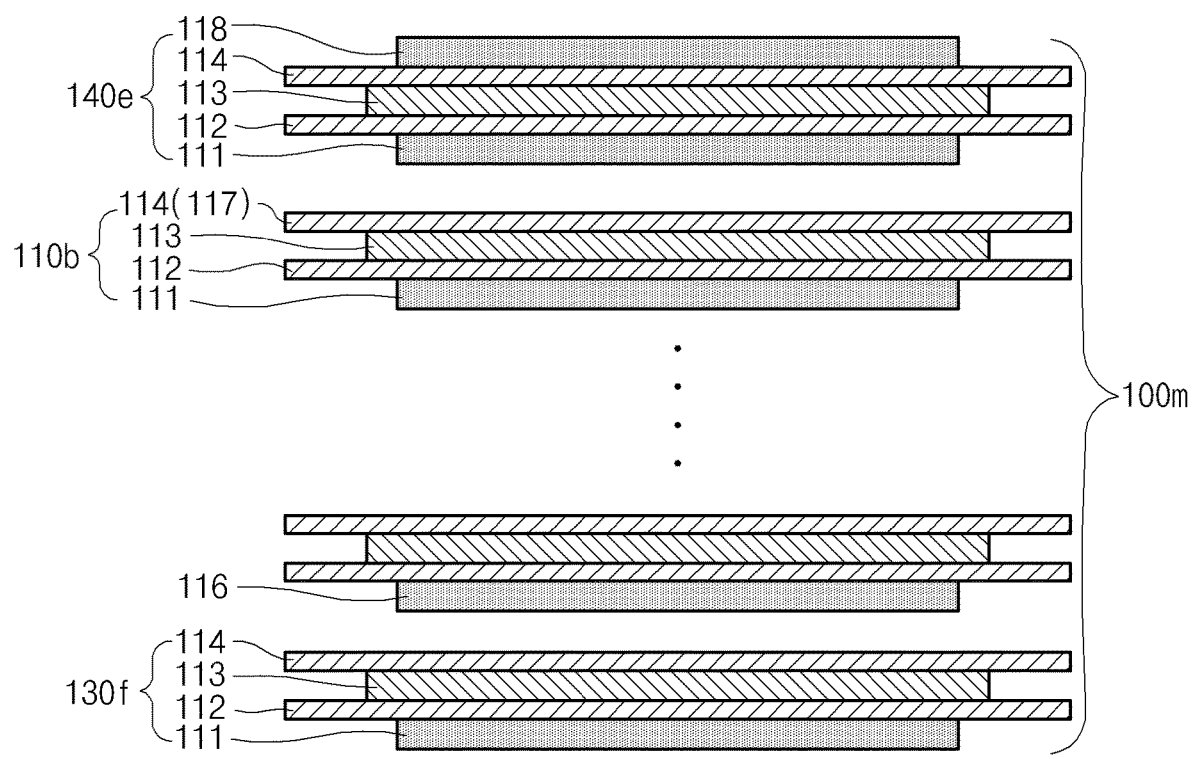
FIG. 25 is a side view illustrating a tenth structure of a unit stack part including radical units, a first auxiliary unit, and a second auxiliary unit according to the present invention.

Referring to FIG. 25, a unit stack part 100m may be formed. A radical unit 110b may be formed by sequentially stacking a first electrode 111, a first separator 112, a second electrode 113, and a second separator 114 from the lower side of the radical unit 110b to the upper side thereof. The first electrode 111 may be a cathode, and the second electrode 113 may be an anode.

A first auxiliary unit 130f may be formed by sequentially stacking a separator 114, an anode 113, a separator 112, and a cathode 111 from a distal end electrode 116. The cathode 111 of the first auxiliary unit 130f includes a collector, and an active material layer may be formed on only a surface of the collector facing the radical unit 110b.

A second auxiliary unit 140e may be formed by sequentially stacking a cathode 111 (a first cathode), a separator 112, an anode 113, a separator 114, and a cathode 118 (a second cathode) from a distal end separator 117. The cathode 118 (the second cathode) of the second auxiliary unit 140e, which is disposed an outermost side thereof, includes a collector, and an active material layer may be formed on only a surface of the collector facing the radical unit 110b.

Figure 26:
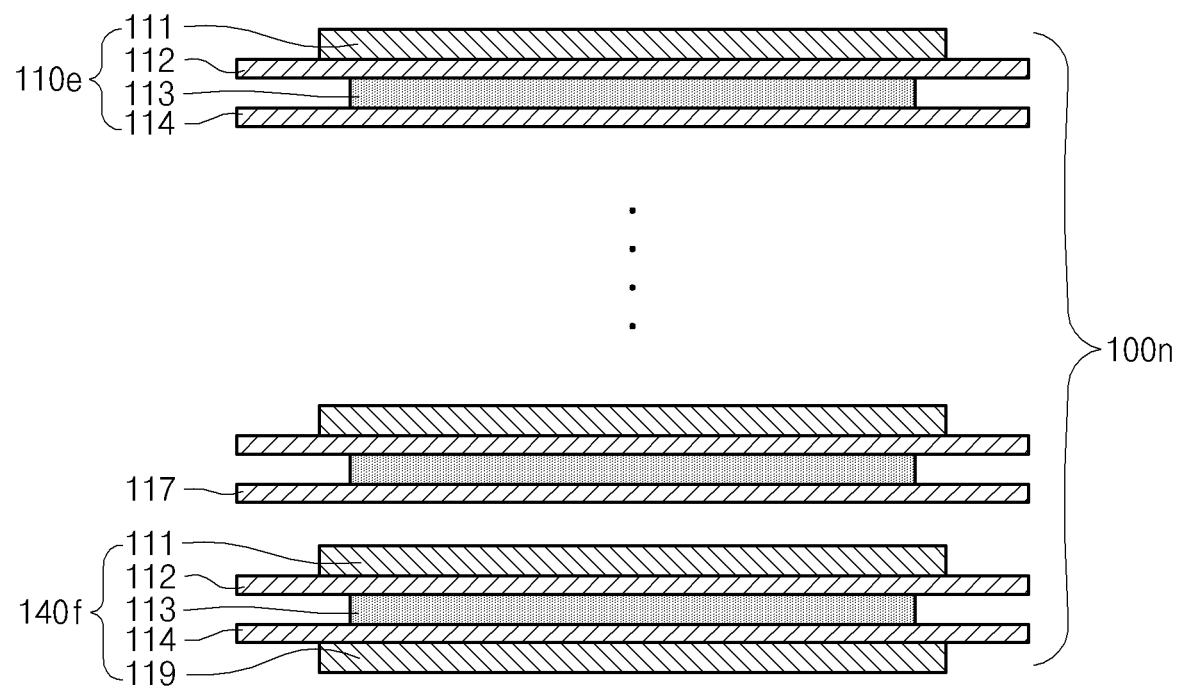
FIG. 26 is a side view illustrating an eleventh structure of a unit stack part including radical units and a second auxiliary unit according to the present invention.

Finally, referring to FIG. 26, a unit stack part 100n may be formed. A radical unit 110e may be formed by sequentially stacking a first electrode 111, a first separator 112, a second electrode 113, and a second separator 114 from the upper side of the radical unit 110e to the lower side thereof. The first electrode 111 may be an anode, and the second electrode 113 may be a cathode. A second auxiliary unit 140f may be formed by sequentially stacking an anode 111, a separator 112, a cathode 113, a separator 114, and an anode 119 from a distal end separator 117.

While the present invention has been particularly shown and described with reference to exemplary embodiments and drawings thereof, it will be understood by those of ordinary skill in the art that various modifications and changes in form and details may be made therein without departing from the spirit and scope of the present invention as defined by the following claims.

INDUSTRIAL APPLICABILITY

According to the present invention, a pouch type secondary battery can have an appropriate structure for improving electrical capacity thereof.

The invention claimed is:

1. A pouch type secondary battery comprising an electrode assembly accommodated in an accommodating part of a pouch exterior part,
wherein a vertex part of an inner surface of the accommodating part is rounded,
the electrode assembly comprises a unit stack part that has a structure (a) in which a type of radical units are repeatedly disposed, wherein electrodes and separators are alternately disposed and are integrally coupled in the radical units, and the number of the electrodes is the same as the number of the separators, or a structure (b) in which two or more types of radical units are disposed in a predetermined order, wherein electrodes and separators are alternately disposed and are integrally coupled in the radical units, and the number of the electrodes is the same as the number of the separators, distal ends of neighboring ones of the separators are not adhered to each other,
the type of the radical units of the structure (a) have a four-layer structure formed by sequentially stacking a first electrode, a first separator, a second electrode, and a second separator, or a structure formed by repeatedly stacking the four-layer structure,
when the two or more types of the radical units of the structure (b) are stacked one by one in the predetermined order, the four-layer structure or the structure formed by repeatedly stacking the four-layer structure is formed, and
vertex parts of the separators are rounded to correspond to the vertex part of the inner surface of the accommodating part,
wherein thermal deformation rates of the first and second separators are greater than those of the first and second electrodes and the first and second electrodes are configured to short-circuit in response to the first and second separators contracting a predetermined amount,
wherein a radical unit of said radical units closest to the vertex part of the inner surface of the accommodating part has a smaller horizontal and vertical size than the other of said radical units,
wherein each boundary edge where the inner surface of the accommodating part meets a bottom surface of the accommodating part is rounded,
wherein said radical unit closest to the vertex part of the inner surface of the accommodating part contacts the bottom surface of the accommodating part, and
wherein a distance (D3) between a side of the electrode assembly and the inner surface of the accommodating part is the same as a distance (D2) between a vertex of the electrode assembly and the inner surface of the accommodating part whereby a gap between the electrode assembly and the inner surface of the accommodating part is minimized.

2. The pouch type secondary battery of claim 1, wherein vertex parts of the electrodes are rounded.

3. The pouch type secondary battery of claim 1, wherein neighboring ones of the radical units in the unit stack part are not coupled to each other, or are coupled to each other by coupling force that is different from coupling force between the electrodes and the separators in the radical units.

4. The pouch type secondary battery of claim 1, wherein the type of the radical units of the structure (a) comprise a first radical unit that has the four-layer structure or the structure formed by repeatedly stacking the four-layer structure, and
the unit stack part has a structure formed by repeatedly disposing the first radical unit.

5. The pouch type secondary battery of claim 1, wherein the two or more types of the radical units of the structure (b) comprises
a second radical unit formed by sequentially disposing and integrally coupling a first electrode, a first separator, a second electrode, a second separator, a first electrode, and a first separator, and
a third radical unit formed by sequentially disposing and integrally coupling a second electrode, a second separator, a first electrode, a first separator, a second electrode, and a second separator, and the unit stack part has a structure formed by alternately disposing the second and third radical units.

6. The pouch type secondary battery of claim 1, wherein each of the electrodes is adhered to a separator adjacent to the electrode in the radical unit including the separator.

7. The pouch type secondary battery of claim 6, wherein a surface of the electrode facing the separator adjacent to the electrode is entirely adhered to the separator.

8. The pouch type secondary battery of claim 6, wherein the electrode and the separator are adhered to each other by pressing the electrode and the separator or pressing and heating the electrode and the separator.

9. The pouch type secondary battery of claim 6, wherein adhesive force between the electrode and the separator in the radical unit is greater than adhesive force between the radical units in the unit stack part.

10. The pouch type secondary battery of claim 1, wherein the unit stack part further comprises a second auxiliary unit disposed as a layer on a distal end separator as the separator disposed on the uppermost or lowermost side of the unit stack part, and
when the electrode of the radical units contacting the distal end separator is a cathode, the second auxiliary unit is formed by sequentially stacking a first anode, a separator, a cathode, a separator, and a second anode from the distal end separator.

11. The pouch type secondary battery of claim 6, wherein the separator comprises a porous separator base material and a porous coating layer that is formed on the whole of one or both surfaces of the porous separator base material,
the coating layer is formed of a mixture of inorganic particles and a binder polymer that connects and fixes the inorganic particles to one another, and
the electrode is adhered to the separator by the coating layer.

12. The pouch type secondary battery of claim 11, wherein the inorganic particles constitute a densely packed structure to form interstitial volumes between the inorganic particles in the whole of the coating layer, and the interstitial volumes defined by the inorganic particles form a porous structure in the coating layer.

13. The pouch type secondary battery of claim 1, wherein the unit stack part further comprises a first auxiliary unit disposed as a layer on a distal end electrode as the electrode disposed on the uppermost or lowermost side of the unit stack part, and
when the distal end electrode is a cathode, the first auxiliary unit is formed by sequentially stacking a separator and an anode from the distal end electrode, and
when the distal end electrode is an anode, the first auxiliary unit is formed by sequentially stacking a separator, a cathode, a separator, and an anode from the distal end electrode.

14. The pouch type secondary battery of claim 13, wherein the first auxiliary unit further comprises a separator at an outside of the anode thereof.

15. The pouch type secondary battery of claim 1, wherein the unit stack part further comprises a second auxiliary unit disposed as a layer on a distal end separator as the separator disposed on the uppermost or lowermost side of the unit stack part, and
when the electrode of the radical units contacting the distal end separator is a cathode, the second auxiliary unit is formed as an anode, and
when the electrode of the radical units contacting the distal end separator is an anode, the second auxiliary unit is formed by sequentially stacking a cathode, a separator, and an anode from the distal end separator.

16. The pouch type secondary battery of claim 15, wherein the second auxiliary unit further comprises a separator at an outside of the anode thereof.

17. The pouch type secondary battery of claim 1, wherein the unit stack part further comprises a first auxiliary unit disposed as a layer on a distal end electrode as the electrode disposed on the uppermost or lowermost side of the unit stack part, and
when the distal end electrode is a cathode, the first auxiliary unit is formed by sequentially stacking a separator, an anode, a separator, and a cathode from the distal end electrode, and
when the distal end electrode is an anode, the first auxiliary unit is formed by sequentially stacking a separator and a cathode from the distal end electrode.

18. The pouch type secondary battery of claim 17, wherein the cathode of the first auxiliary unit comprises:
a collector; and
an active material applied to only one of both surfaces of the collector, the one surface facing the radical units.

19. The pouch type secondary battery of claim 17, wherein vertex parts of the first auxiliary unit are rounded to correspond to the vertex part of the inner surface of the accommodating part.

20. The pouch type secondary battery of claim 1, wherein the unit stack part further comprises a second auxiliary unit disposed as a layer on a distal end separator as the separator disposed on the uppermost or lowermost side of the unit stack part, and
when the electrode of the radical units contacting the distal end separator is a cathode, the second auxiliary unit is formed by sequentially stacking an anode, a separator, and a cathode from the distal end separator, and
when the electrode of the radical units contacting the distal end separator is an anode, the second auxiliary unit is formed as a cathode.

21. The pouch type secondary battery of claim 20, wherein the cathode of the second auxiliary unit comprises:
a collector; and
an active material applied to only one of both surfaces of the collector, the one surface facing the radical units.

22. The pouch type secondary battery of claim 20, wherein vertex parts of the second auxiliary unit are rounded to correspond to the vertex part of the inner surface of the accommodating part.

23. The pouch type secondary battery of claim 1, wherein the unit stack part further comprises a second auxiliary unit disposed as a layer on a distal end separator as the separator disposed on the uppermost or lowermost side of the unit stack part, and
when the electrode of the radical units contacting the distal end separator is an anode, the second auxiliary unit is formed by sequentially stacking a first cathode, a separator, an anode, a separator, and a second cathode from the distal end separator.

24. The pouch type secondary battery of claim 23, wherein the second cathode of the second auxiliary unit comprises:
a collector; and
an active material applied to only one of both surfaces of the collector, the one surface facing the radical units.

25. The pouch type secondary battery of claim 23, wherein vertex parts of the second auxiliary unit are rounded to correspond to the vertex part of the inner surface of the accommodating part.

\* \* \* \* \*